(12) United States Patent
Sarkar et al.

(10) Patent No.: US 8,487,142 B2
(45) Date of Patent: Jul. 16, 2013

(54) PROCESS FOR PRODUCING SMALL MOLECULAR WEIGHT ORGANIC COMPOUNDS FROM CARBONACEOUS MATERIAL

(75) Inventors: Manoj Kumar Sarkar, Hyderabad (IN); Dhurjati Prasad Chakrabarti, Hyderabad (IN); Dhruba Sarkar, Hyderabad (IN); Banibrata Pandey, Hyderabad (IN)

(73) Assignee: Nagarjuna Energy Private Limited (IN)

( * ) Notice: Subject to any disclaimer, the term of this patent is extended or adjusted under 35 U.S.C. 154(b) by 312 days.

(21) Appl. No.: 12/671,482

(22) PCT Filed: Jul. 31, 2008

(86) PCT No.: PCT/IB2008/001985
§ 371 (c)(1),
(2), (4) Date: Jul. 7, 2011

(87) PCT Pub. No.: WO2009/016477
PCT Pub. Date: Feb. 5, 2009

(65) Prior Publication Data
US 2011/0313178 A1    Dec. 22, 2011

(30) Foreign Application Priority Data

Aug. 1, 2007 (IN) .............................. 221/CHE/2007

(51) Int. Cl.
*C07C 29/132* (2006.01)
(52) U.S. Cl.
USPC .......................................... 568/885; 518/702
(58) Field of Classification Search
USPC .......................................... 568/885; 518/702
See application file for complete search history.

(56) References Cited

U.S. PATENT DOCUMENTS 3,684,689 A * 8/1972 Patton et al. .................... 208/54

FOREIGN PATENT DOCUMENTS

DE    3438217 A1 *    4/1986

* cited by examiner

*Primary Examiner* — Elvis O Price
(74) *Attorney, Agent, or Firm* — Bobby W. Braxton; Colin P. Cahoon; Carstens & Cahoon, LLP

(57) ABSTRACT

The present invention discloses a process for producing small molecular weight organic compounds from carbonaceous material comprising a step of contacting the carbonaceous material with carbon monoxide (CO) and steam in presence of a shift catalyst at a predetermined temperature and pressure.

8 Claims, 5 Drawing Sheets

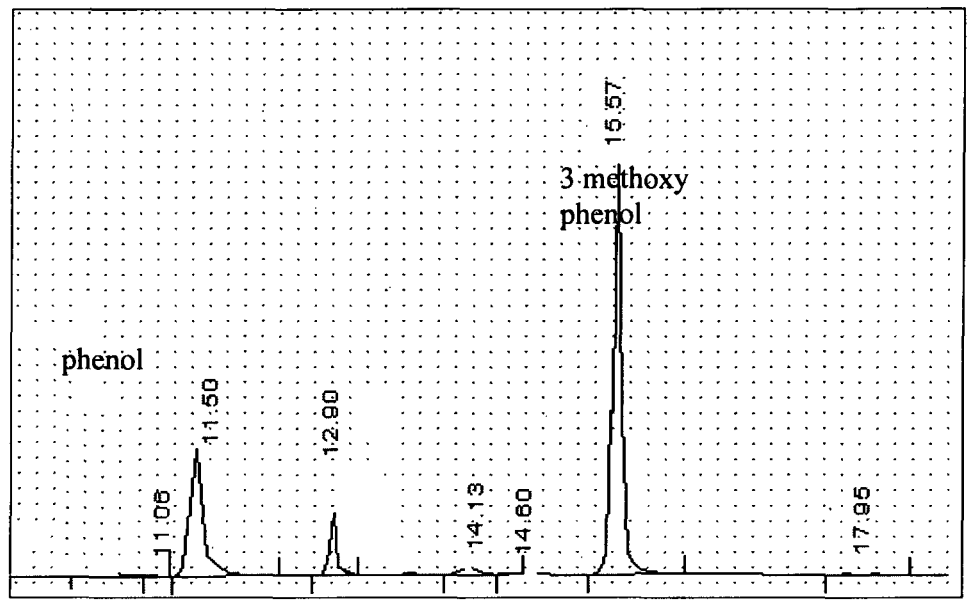
Figure 1: 3MeO- phenol to phenol with CO in 3 hrs.
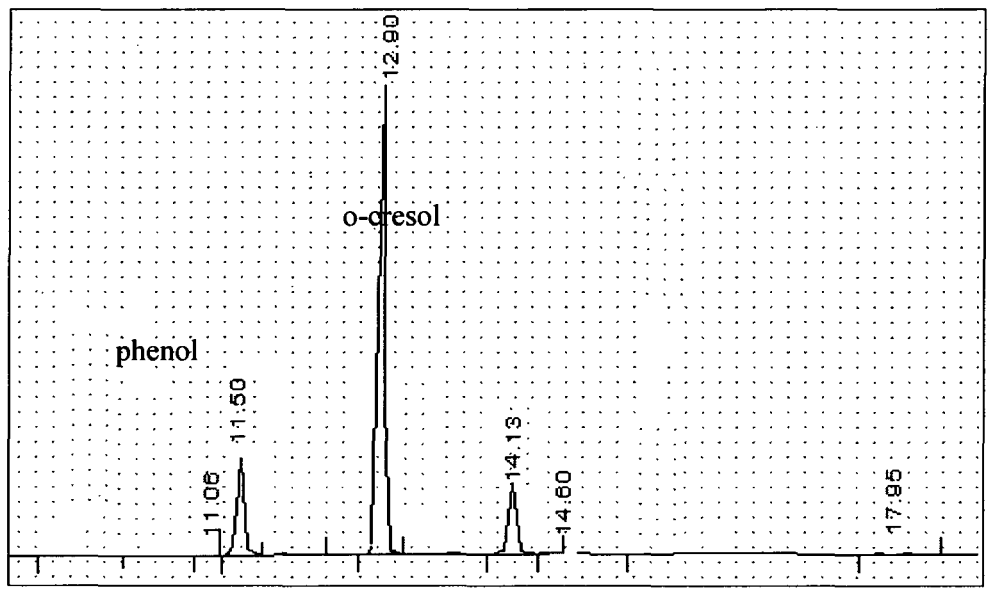
Figure 2: o-Cresol to phenol and 2,5 dimethyl phenol with CO in 3 hrs.

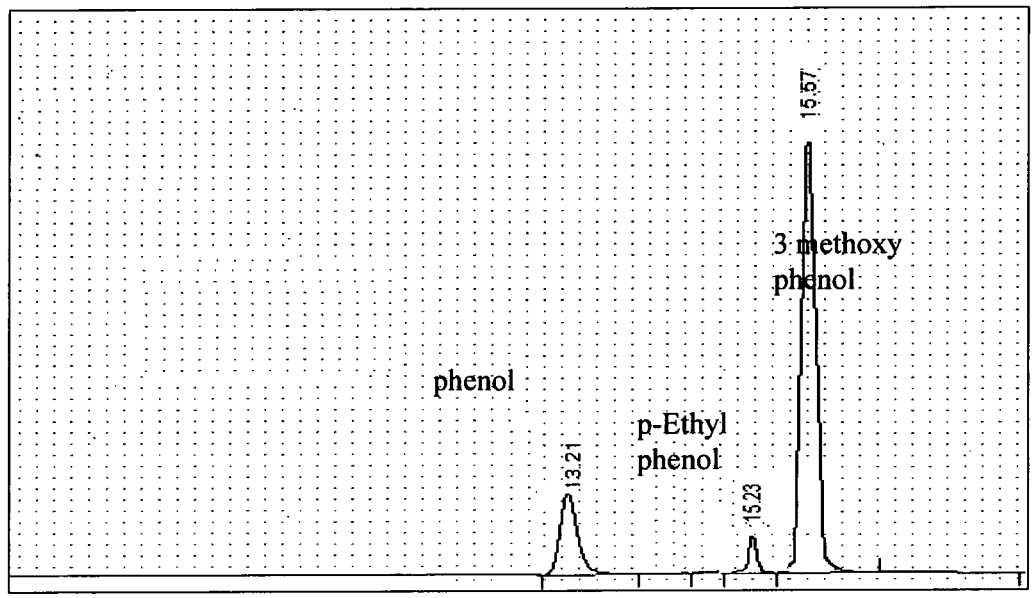
Figure 3
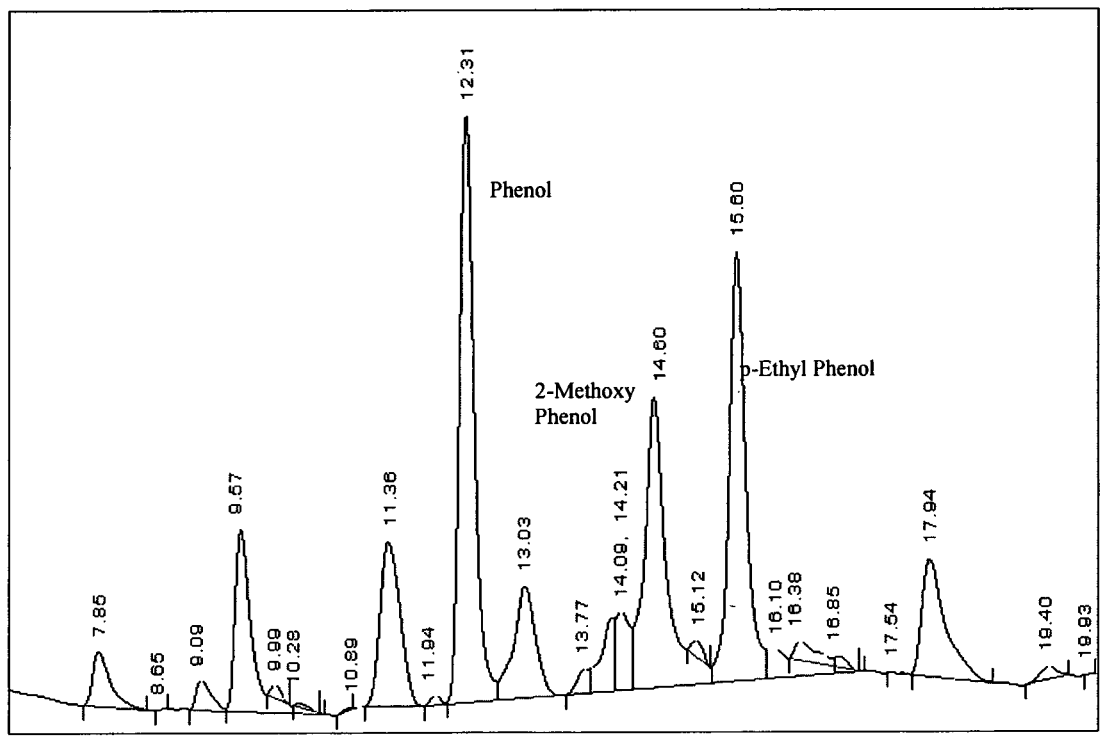
Figure 4a: Lignin degradation with CO after 60 mins

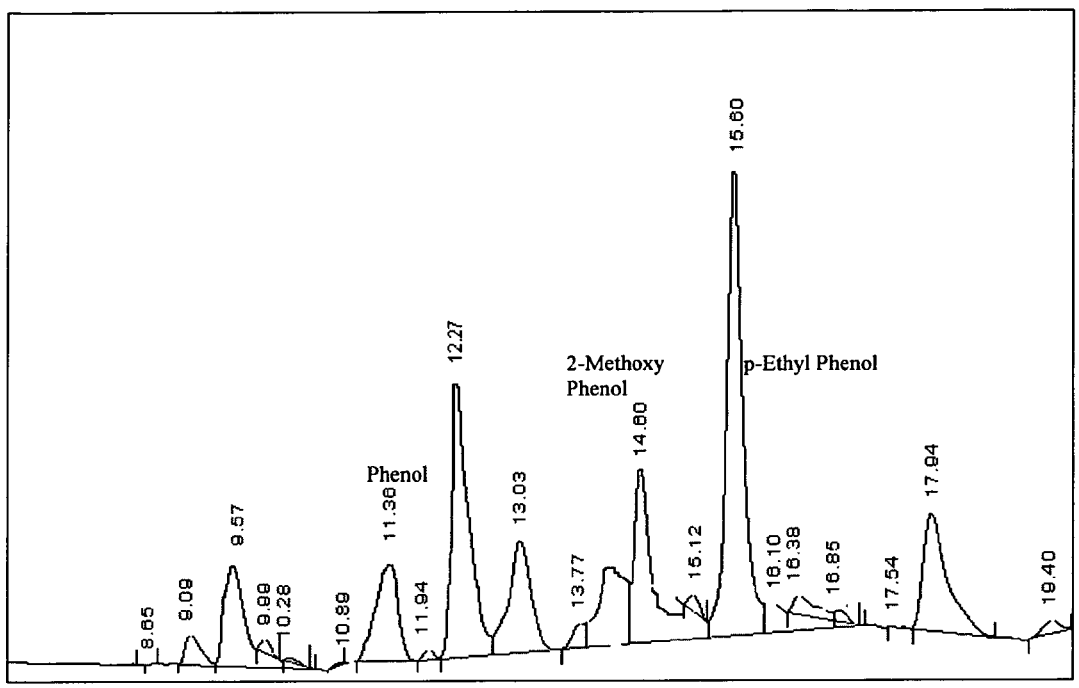
Figure 4b: Lignin degradation with CO after 90 mins
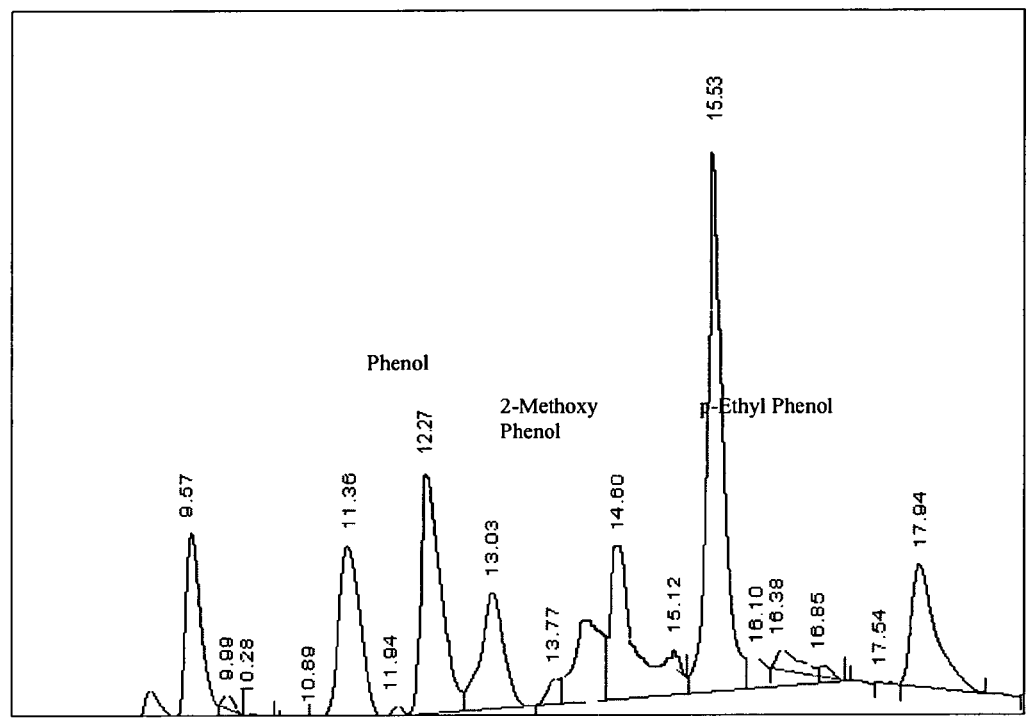
Figure 4c: Lignin degradation with CO after 180 mins

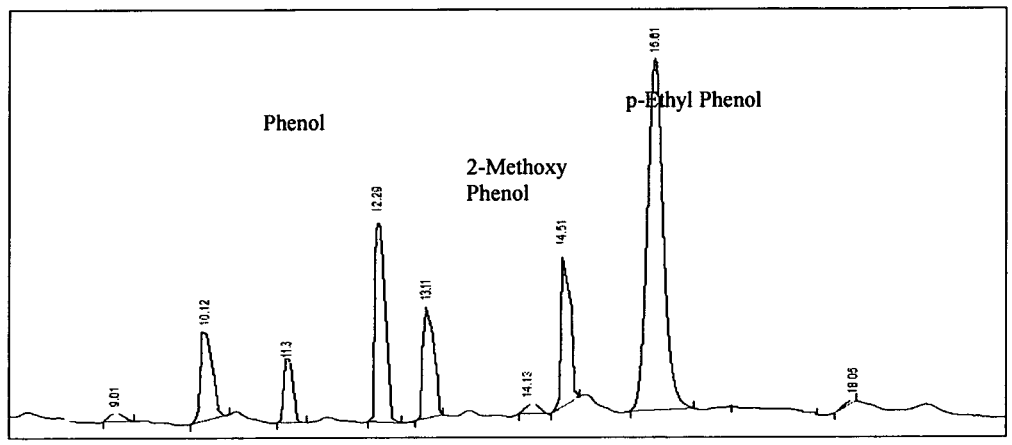
Figure 5a: With CO at 250° C and 30 bar
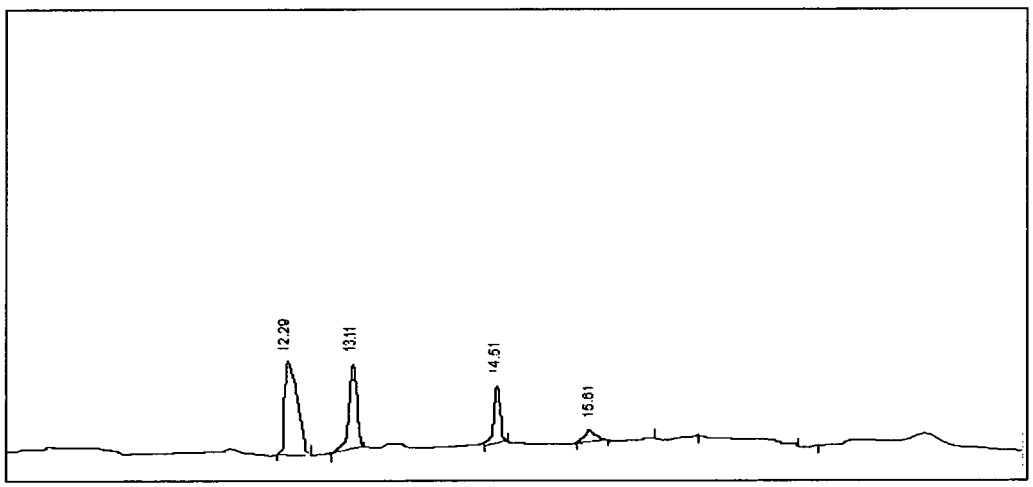
Figure 5b: With H₂ at 250° C and 30 bar

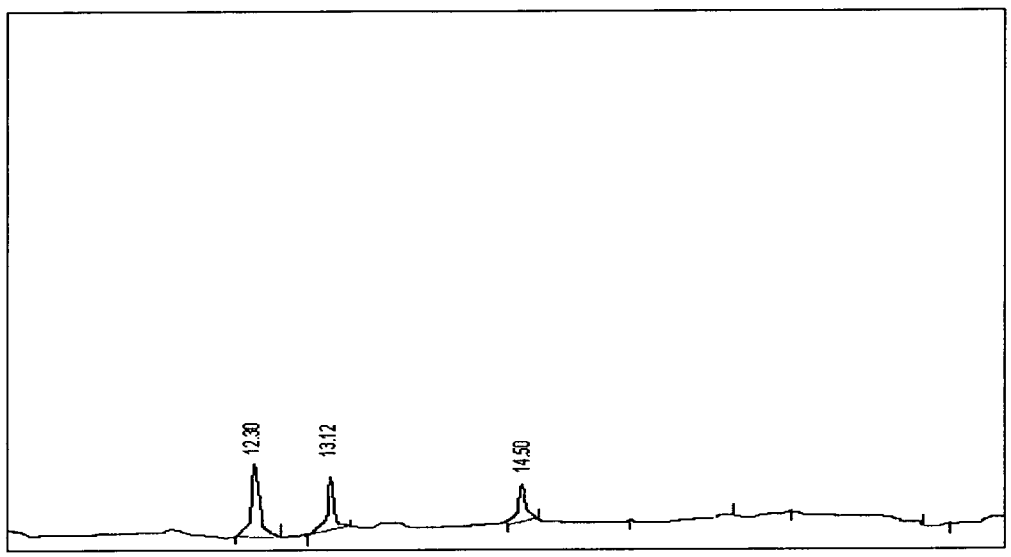
Figure 5c: With $N_2$ at $250^0$ C and 30 bar

PROCESS FOR PRODUCING SMALL MOLECULAR WEIGHT ORGANIC COMPOUNDS FROM CARBONACEOUS MATERIAL

FIELD OF INVENTION

The present invention relates to a process for producing small molecular weight organic compounds from carbonaceous material, particularly, the present invention relates to a process for producing small molecular weight organic compounds by hydro-cracking and/or de-oxygenation of carbonaceous matter by water gas shift reaction.

BACKGROUND OF THE INVENTION

There is a growing concern with the long term security of supply of energy at reasonable prices in a context of sustainable social and economic development. Conversion of heavy aromatic feedstock to lighter one suitable to run an engine motor becomes a major focus. This heavy stock either derived from petroleum feedstock or from lignocellulosic biomass converted into lighter products under a wide range of very high pressures and fairly high temperatures, in the presence of hydrogen and special catalysts. When the feedstock has a high paraffinic content, the primary function of hydrogen is to prevent the formation of polycyclic aromatic compounds. The process usually followed cracking or hydrotreating/hydrocracking. Hydrotreating requires large volumes of hydrogen which impairs the process economics. Another important role of hydrogen in the hydro-cracking process is to reduce tar formation and prevent buildup of coke on the catalyst. Hydrogenation also serves to convert sulfur and nitrogen compounds present in the feedstock to hydrogen sulfide and ammonia. Most of the hydro-cracking unit has reliability problems with the reciprocating hydrogen make up and recycle compressors due to its high pressure operation. Different portion and accessories in a Hydrocracker Unit suffered from hot sulphur corrosion and a weld repair became necessary to avoid potential collapse of the internal gasket seating face and the subsequent ingress of high-pressure hydrogen into a low-pressure region.

Previous works describe the cracking process mostly in presence of hydrogen to result a high pressure system. U.S. Pat. No. 7,132,042 describes a process for preparing dewaxed fuel and lubricant base stocks by (a) producing a synthesis gas from natural gas, (b) reacting the $H_2$ and CO in the gas in the presence of a cobalt Fischer-Tropsch catalyst, at reaction conditions effective to synthesize a waxy hydrocarbon feed boiling in the fuel and lubricant oil ranges, which hydrodewaxed in a first stage to produce a dewaxed fuel and a partially dewaxed lubricant fraction. The partially dewaxed lubricant fraction is separated into heavy and lower boiling fractions. U.S. Pat. No. 7,163,963 is generally related to the field of Fischer-Tropsch catalysts. In particular, the present invention is related to a Fischer-Tropsch catalyst and method of making same. Here also hydrogen is a necessity and pressure requirement is high. A method for producing a hydrogen-rich syngas is disclosed in U.S. Pat. No. 7,160,534. According to this method, a CO-containing syngas contacts a platinum-free ruthenium-cobalt water gas shift ("WGS") catalyst, in the presence of water and preferably at a temperature of less than about 450° C., to produce a hydrogen-rich syngas. It disclosed a platinum-free ruthenium-cobalt water gas shift catalyst formulated from: a) Ru, its oxides or mixtures thereof; b) Co, Mo, their oxides or mixtures thereof; and c) at least one of Li, Na, K, Rb, Cs, Ti, Zr, Cr, Fe, La, Ce, Eu, their oxides, supported on a carrier, such as any one member or a combination of alumina, zirconia, titania, ceria, magnesia, lanthania, niobia, zeolite, perovskite, silica clay and iron oxide. U.S. Pat. No. 7,150,866 relates to a catalyst and a process for the autothermal, catalytic steam reforming of hydrocarbons using the catalyst. The multilayer catalyst in this process is used for producing hydrogen-containing fuel gases in reformer systems, preferably for fuel cells. In U.S. patent U.S. patent a CO-selective catalyst comprises a catalytic material, wherein the catalytic material is selected from the group consisting of Pt, Pd, Rh, Ir, Os, Ru, Ta, Zr, Y, Ce, Ni, Cu, and oxides. The method for forming the CO selective catalyst comprises combining a catalytic material and a support. A method of making degraded aromatics or surfactants from lignin is disclosed in U.S. Pat. No. 6,207,808 by reducing lignin in the presence of a metal oxide or iron based catalyst in an organic hydrogen donor solvent. To produce lignin phenol, one or a combination of several reactions such as alkoxylation, alkylation, sulfonation, sulfation, alkoxysulfation, and sulfomethylation is utilized here. Another similar method of making surfactants from lignin is disclosed in U.S. Pat. No. 6,100,385. U.S. Pat. No. 5,807,952 describes a process for the production of low molecular weight phenolic compounds from lignins through the pyrolysis of the lignins in the presence of a strong base. In a preferred embodiment, potassium hydroxide is present in trace amount and the pyrolysis temperature is 400° C. to 600° C. at atmospheric pressure and the time period for substantial completion of the reaction is from about 1-3 minutes. In U.S. Pat. No. 4,647,704 hydrocracking of lignin in the presence of a supported tungsten-nickel catalyst on mildly acidic supports affords phenolic compounds in higher yield and with greater selectivity. Lewis acid such as ferrous chloride, increased yields of both cresols and $C_6$-$C_9$ phenolics are obtained. In U.S. Pat. No. 4,420,644 carbonaceous feed material in particulate form is mixed with a process-derived slurrying oil and fed into an ebullated catalyst bed hydrocracking reactor. Reaction conditions are maintained at 650° F. to 850° F. temperature, 500-2500 psig hydrogen partial pressure and space velocity of 1.0-10 wt. lignin/hr/wt catalyst. Major yield of phenol and benzene is the central point of this process.

OBJECTS OF THE PRESENT INVENTION

The main object of the present invention is to a process for producing small molecular weight organic compounds from carbonaceous material.

Another object of the present invention is to provide a process for producing small molecular weight organic compounds from carbonaceous material which overcomes at least one of the problem of the prior art processes.

still another object of the present invention is to provide a process for producing small molecular weight organic compounds from carbonaceous material at lower pressure and temperature requirements as compared to the prior art processes.

Yet another object of the present invention is to provide a process for producing small molecular weight organic compounds by hydro-cracking and/or de-oxygenation of carbonaceous matter by water gas shift reaction.

One more object of the present invention is to provide a process for de-oxygenation of hydroxyl, ester, epoxy or phenolic or conversion of crude-oil.

SUMMARY OF INVENTION

In the process of the present invention pressure factor in the hydro-cracking has been avoided by producing hydrogen in situ and a new series of catalysts have been developed by catalytic water gas shift (WGS) reaction in presence of carbon monoxide gas and steam or water. Here carbon monoxide is used as de-oxygenator of the oxygen rich compound additionally. To affect the process more efficient a new series of catalysts have been developed, among which low temperature preparation method from the ammonia complex of the transition metal oxalate is very significant. Supported transition metal catalyst can be used in this method in presence of carbon monoxide to restrict the process within 250-450° C. and 2-30 bar pressure.

Most of the Hydrogen utilized in the industries is generated through shift reaction of carbon monoxide which is energy intensive and requires a separate system to generate the same. The idea has been developed to bring down the pressure of the reaction, that has been carried out at 2-30 bar by the incorporation of nascent hydrogen instead of gaseous hydrogen. The water-gas shift (WGS) is one of the oldest catalytic processes employed in the chemical industry for producing active hydrogen. In this reaction steam and carbon monoxide gas is used to produce hydrogen at 220-450° C. in presence of catalyst.

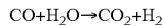
$$CO + H_2O \rightarrow CO_2 + H_2$$

BRIEF DESCRIPTION OF DRAWINGS

FIG. 1 conversion of 3MeO-phenol to phenol with CO in 3 hrs according to the process of the present invention.

FIG. 2 shows conversion of o-Cresol to phenol and 2,5 dimethyl phenol with CO in 3 hrs according to the process of the present invention.

FIG. 3 shows result of selective deoxygenation and hydrogenation from shift reaction.

FIGS. 4a, 4b and 4c show results for Lignin degradation with CO after 60 mins, 90 mins and 180 mins respectively according to the process of the present invention.

FIG. 5a shows results of lignin deoxygenation by the process of the present invention CO at 250° C. and 30 bar.

FIG. 5b shows results of lignin deoxygenation by the process of the present invention with $H_2$ at 250° C. and 30 bar.

FIG. 5c: shows results of lignin deoxygenation by the process of the present invention with $N_2$ at 250° C. and 30 bar.

DETAILED DESCRIPTION OF THE PRESENT INVENTION

Accordingly, the present invention provides a process of the present invention can produce small molecular weight organic compounds from carbonaceous material. The carbonaceous material can be selected from the group comprising but not limited to long chain hydrocarbons, carbonaceous solid wastes, lingo-cellulosic mass, craft wood, plant solid wastes. Small molecular weight compounds which can be produced from the process of the present invention are selected from the group comprising but not limited to aromatics, alcohols, furans etc.

In the process of the present invention the carbonaceous material is contacted with water and/or steam and with carbon monoxide in presence of shift catalyst. Any shift catalyst which suitable in carrying out the water gas shift reaction (WGS) can be used in the process of the present invention. The shift catalyst which is a formed solid shift catalyst can be used in the process of the present invention or the shift catalyst can be impregnated in the carbonaceous material.

In the process of the present invention hydrogen in nascent form is generated in nascent form which causes hydrocracking and/or de-oxygenation. Since nascent hydrogen is very active therefore, the pressure and temperature requirement in the process of the present invention is much lower than the conventionally known processes.

The temperature required in the process of the present invention is in the range of 250-450° C. and pressure is in the range of 1 to 50 bar. As it can be clearly understood that pressure and temperature requirement in the present process is much lower.

In the process of the present invention can be used effectively to produce light oils, phenols, lower aromatics from heavier cuts. In mechanism of the process of the present invention the elemental hydrogen seats on the catalyst surface to be available for hydrogenation of unsaturation, oxygen linkage or for deoxygenation at a substantial low pressure. In the process of the present invention the hydrogen produced in a nascent form faces a competition between the attraction of another atomic hydrogen and the active catalyst site. It seats on the active catalyst site to be available for hydrogenation and so on cracking. Nascent hydrogen is very active without pressure and it overcomes the thermodynamic barrier of the molecular or gaseous hydrogen where 100-150 bar pressure is a necessity and temperature ranges from 400-450° C. In the process of the present invention the thermodynamic constraint of temperature can also be overcome by carrying the process between 250-450° C.

For degradation of a carbonaceous solid waste, ligno-cellulosic mass, craft wood etc. the process of the present invention is very useful. Catalyst have been prepared in-situ and deposited on the sample mass because molecularly dispersed catalyst are more active and they can attract atomic hydrogen to cross the barrier of high pressure and temperature of the conventional hydrocracking. In a mixture of zinc oxalate (30-70% ZnO) and nickel oxalate (20-80% NiO) and biomass or solid source ammonia gas has been passed to maintain a pressure of (5-18 bar). At a temperature between 200-400° C. these complexes are well decomposed to form the oxides and they are deposited on the surface of the biomass. The thermal decomposition metal oxalate ammonia complex have been investigated using thermo gravimetric analysis-mass spectroscopy (TGA-MS). Oxalate hydrate decomposes in two steps. Water is lost at 150-200° C. to produce the anhydrous compound which decomposes to form oxide at 320-370° C. Ammonia is lost 140° C.-220° C. to produce anhydrous metal oxalate. The present process as well as the catalyst is unique in comparison to the conventional co precipitation process as it requires a high temperature of 650 C. which has made the solid biomass or carbonaceous matter prone to polymerisation and coke formation.

Hydroxyl carbon-oxygen bond cleavage is a chemical transformation of importance in upgrading of lingo-cellulose, plant solid wastes or carbonaceous solids. There have been numerous attempts to discover general methods for the cleavage of aryl carbon-oxygen bonds. All the stoichiometric organic methods for phenol deoxygenation have limited applications and involve expensive reagents. Catalytic method, for the hydrodeoxygenation (HDO) of phenols involve supported transition metal oxides. Typical phenol hydrodeoxygenation conditions involve hydrogen pressures in excess of 100 bar and temperatures in excess of 200 C. Under these conditions arene ring hydrogenation is generally found to compete with phenol deoxygenation; and the coproduct water is found to impair the activity of the catalysts.

This present method offers the possibility of effecting the selective catalytic deoxygenation of phenolic or any hydroxyl functional groups using CO resulted from WGS.

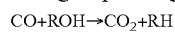
$$CO + ROH \rightarrow CO_2 + RH$$

The deoxygenation of C—O—X (X=H, R, Ar etc) by carbon monoxide mediated by WGS has provided us with a catalytic deoxygenation pathway, through the elimination of $CO_2$ and formation of a aromatic or hydrocarbon intermediate. The mechanism probably mediated by metal O—C complex. Due to the presence of the structurally sensitive complexes the reaction is facilitated.

The present invention is described with reference to the figures and specific embodiments; this description is not meant to be construed in a limiting sense. Various alternate embodiments of the invention will become apparent to persons skilled in the art upon reference to the description of the invention. It is therefore contemplated that such alternative embodiments form part of the present invention.

Example 1

10% wt/volume 3-Methoxy phenol in water was heated in a 600 cc stainless steel stirred reactor at 250° C. temperature for three hours in a carbon monoxide whose pressure is maintained at 30 bar. In this experiment 0.1% (w.r.t. substrate) catalyst containing Ruthenium oxide with 2% Ru and 7% Cobalt molybdate with 30% Cobalt and 70% Molybdate used on a 80/20 silica-alumina cogelled base. After the reaction, the reaction mixture is cooled, filtered and extracted with dichloromethane. The extract composition is determined by gas chromatography. The presence of phenol (17% wrt substrate) and o-Cresol (7% wrt substrate) in the extract justifies the selective pyrolysis, deoxygenation hydrogenation resulted from shift reaction. The same reaction is carried out with hydrogen and nitrogen instead of carbon monoxide in two different runs respectively. In these two reactions the substrate, solvent and the catalyst were used in same proportion (also composition) as described in example 1a and the reaction condition remain same. The cooled reaction mixture is filtered and extracted with dichloromethane. The extract is examined by gas chromatography (FIG. 1). In nitrogen atmosphere no phenol is resulted whereas with hydrogen phenol production is only 2.3%. This fact reveals the superiority of CO as a deooxygenetor at mild condition.

Example 2

5% wt/volume o-Cresol in water is heated in a 600 cc stainless steel stirred reactor at 250° C. temperature for three hour in carbon monoxide whose pressure is maintained at 30 bar. In this experiment 0.1% (w. r. t. substrate) catalyst containing Nickel oxide with 8% Ni used on a 80/20 silica-alumina cogelled base. The cooled reaction mixture is filtered and extracted with dichloromethane. The extract is examined by gas chromatography. The presence of phenol (9.8% wrt substrate) and 2,5-dimethyl phenol (7% wrt substrate) in the extract justifies the selective pyrolysis and hydrogenation resulted from shift reaction (FIG. 2).

Example 3

10% wt/volume 3-Methoxy phenol in water is heated in a 600 cc stainless steel stirred reactor at 150° C. temperature for four hours in carbon monoxide whose pressure is maintained at 15 bar. In this experiment 3.6 mol % (w. r. t. substrate) catalyst containing Ru/γ-$Al_2O_3$ with 1.25% Ru used. The cooled reaction mixture is filtered and extracted with dichloromethane. The extract composition is determined by gas chromatography. The presence of o-Cresol (10% wrt substrate) as major product and p-Ethyl phenol (2.3% wrt substrate) in the extract justifies the selective deoxygenation and hydrogenation resulted from shift reaction (FIG. 3).

Example 4 a) In this reaction a mild basic condition with 2% sodium carbonate solution of 5 gm lignin isolated from lignocelluosic biomass in 100 cc basic water is used and the reaction mixture is heated to 250° C. at 20 bar pressure for 3 hrs with carbon monoxide gas. The catalyst used is 5% zinc oxide and 8% Cobalt (30%) Molybdate (70%) deposited on 80/20 silica-alumina cogelled base. Samples are collected at different time intervals and extracted with dichloromethane. The extract is examined by gas chromatography. The increase in the percentage of p-ethyl phenol (FIGS. 4a, b, c) with time reveals the hydrogenation of double bonds existed in lignin.

b) A lignin feed material from biomass (5 gm lignin in 100 cc 2% solution of sodium carbonate) is fed into an packed catalyst bed of hydrocracking reactor. Reaction conditions are maintained at 250° C. temperature, 20 bar gas pressure with carbon monoxide flow rate is controlled as 20% (rest is nitrogen) catalyst. The operation is continued for 30 mins. The liquid reaction products are extracted with dichloromethane. The products are analysed with GC. Presence of phenolics with p-ethyl phenol as major product expresses the viability of the process.

Example 5

To prove the effectiveness of carbon monoxide, hydrogen and nitrogen environment is used for the lignin deoxygenation. In these three reactions 5 gm of lignin, produced from biomass in 2% sodium carbonate solution 100 cc water is used and the reaction mixture is heated to 250° C. at 30 bar pressure for 3 hrs with the gases respectively. The catalyst used is 5% zinc oxide and 8% Cobalt (30%) Molybdate (70%) deposited on 80/20 silica-alumina cogelled base. Resultants are collected at different time intervals and extracted with dichloromethane. The extract is examined by gas chromatography. The increase in the percentage of selective products and the overall high liquid conversion (24%) with CO reveals the degradation to value added products in terms of deoxygenation and hydrogenation. With hydrogen and nitrogen the overall liquid conversion are 11% and 8% (FIG. 5).

ADVANTAGES OF THE PRESENT INVENTION

1) Nascent hydrogen by means of water gas shift reaction has been used as an economic alternative to hydrocracking.
2) All catalyst support used for hydrocracking (Co—Mo oxide (at any combination), Ni W oxide (at any combination), Fe—Cr oxide (at any combination) or any transition metal combination on any ratio of Si/Al).
3) Use of shift catalyst over hydrocracking catalyst includes all pair of transition metal oxide (at any combination).
4) The transition metal precipitation of shift catalyst over hydrocracking catalyst is used is the present invention.
5) Molecularly dispersed catalyst on solid carbonaceous sample is used in the process of the present invention.
6) The molecular dispersion can be of any combination of any pair of transition metal.
7) Method of preparation of the molecularly dispersed catalyst on the solid sample well below the reaction temperature is new.

8) The method described in the example is the only catalyst making process to prevent polymerization as well as coking.
9) Deoxygenation of carbon-oxygen linkage of heavier cuts or solid carbonaceous matter by the said reaction described in example 4 is new.
10) Deoxygenation of phenols can be done by the process of the present invention.
11) Deoxygenation of any aryl hydroxides can be done by the process of the present invention.
12) Deoxygenation of any hydroxyl group including glucose can be done by the process of the present invention.
13) Opening of epoxy oxygen can be done the process of the present invention.
14) Breaking of ether linkage can be done by the process of the present invention.

We claim:

1. A process for producing small molecular weight organic compounds from carbonaceous material comprising a step of contacting the carbonaceous material with carbon monoxide (CO) and steam in presence of a shift catalyst at a predetermined temperature and pressure.

2. A process as claimed in claim 1, wherein the carbonaceous material selected from the group comprising long chain hydrocarbons, carbonaceous solid wastes, lingo-cellulosic mass, craft wood, plant solid wastes.

3. A process as claimed in claim 1, wherein the small molecular weight compounds are selected from the group comprising, aromatics, alcohols, furans.

4. A process as claimed in claim 1, wherein the shift catalyst is formed solid shift catalyst.

5. A process as claimed in claim 1, wherein the shift catalyst is impregnated in the carbonaceous material.

6. A process as claimed in claim 1, wherein the shift catalyst is capable to perform water gas shift reaction (WGS).

7. A process as claimed in claim 1, wherein the temperature is in the range of 250-450° C.

8. A process as claimed in claim 1, wherein the pressure is in the range 1 to 50 bar.

* * * * *